United States Patent [19]
Hou et al.

[11] Patent Number: 6,113,810
[45] Date of Patent: Sep. 5, 2000

[54] METHODS OF PREPARING ELECTROPHORETIC DISPERSIONS CONTAINING TWO TYPES OF PARTICLES WITH DIFFERENT COLORS AND OPPOSITE CHARGES

[75] Inventors: Wei-Hsin Hou, Bethlehem, Pa.; Frederic E. Schubert, Shoreham, N.Y.

[73] Assignee: Copytele, Inc., Melville, N.Y.

[21] Appl. No.: 08/383,667

[22] Filed: Feb. 3, 1995

Related U.S. Application Data

[63] Continuation of application No. 08/065,871, May 21, 1993, abandoned.

[51] Int. Cl.[7] .................................................. H01B 3/00
[52] U.S. Cl. ............................ 252/572; 313/483; 359/296
[58] Field of Search .......................... 252/572, 73, 77, 252/79; 313/483; 204/299 R; 359/296

[56] References Cited

U.S. PATENT DOCUMENTS

| | | | |
|---|---|---|---|
| 3,484,162 | 12/1969 | Clark | 255/3 |
| 4,093,534 | 6/1978 | Carter et al. | 204/299 R |
| 4,285,801 | 8/1981 | Chiang | 204/299 R |
| 4,298,448 | 11/1981 | Muller et al. | 204/299 R |
| 4,655,897 | 4/1987 | DiSanto et al. | 204/299 R |
| 4,992,192 | 2/1991 | Ahmed | 252/73 |
| 5,229,242 | 7/1993 | Mahabadi et al. | 430/106.6 |
| 5,230,978 | 7/1993 | Kawasaki et al. | 430/106 |

OTHER PUBLICATIONS

Colloids and Surfaces, 6 (1983) p. 83, Luckham et al., no month available.
Colloids and Surfaces, 6 (1983) p. 101, Luckham et al., no month available.
Journal of Chemical Society, Farada 1, 76 (1980), p., 655 no month available.

*Primary Examiner*—Christine Skane
*Attorney, Agent, or Firm*—Arthur L. Plevy; Buchanan Ingersoll PC

[57] ABSTRACT

A dielectric dispersion for use in an electrophoretic display includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second pluralities. In one embodiment, the first and second plurality of particles are each formed by separate two stage dispersion polymerization reactions. Each set of particles is formed with unique secondary and functional monomers. Corresponding charge control agents are added to the dispersion to establish opposite polarities on the respective particles.

18 Claims, 1 Drawing Sheet

METHODS OF PREPARING ELECTROPHORETIC DISPERSIONS CONTAINING TWO TYPES OF PARTICLES WITH DIFFERENT COLORS AND OPPOSITE CHARGES

This is a continuation of application Ser. No. 08/065,871, filed on May. 21, 1993, now abandoned entitled Methods of Preparing Electrophoretic Dispersions Containing Two Types of Particles with Different Colors and Opposite Charges.

FIELD OF THE INVENTION

The present invention relates to dielectric particles and electrophoretic dispersions containing them for use in electrophoretic image displays, electrostatic printing or the like, and a corresponding method of producing same. More particularly, the present invention relates to the formation of stable electrophoretic dispersions which contain two types of particles having different colors and opposite charges.

BACKGROUND OF THE INVENTION

The electrophoretic effect is well known and the prior art is replete with a number of patents and articles which describe the effect. As will be recognized by a person skilled in the art, the electrophoretic effect operates on the principle that certain particles, when suspended in a medium, can be electrically charged and thereby to migrate through the medium to an electrode of opposite charge. Electrostatic printing and electrophoretic image displays (EPID) utilize the electrophoretic effect to produce desired images.

In prior art EPIDs, colored dielectric particles are suspended in a fluid medium of an optically contrasting color as compared to the dielectric particles. The colored electrophoretic particles are then selectively caused to migrate to, and impinge upon, a transparent screen, thereby displacing the fluid medium from the screen surface and creating the desired image. EPIDs commonly use readily manufactured light colored electrophoretic particles suspended in media which contains dark color dyes. Such EPIDs are exemplified in U.S. Pat. Nos: 4,655,897 to DiSanto et al., 4,093,534 to Carter et al., 4,298,448 to Muller et al., and 4,285,801 to Chaing. The dark medium can not be completely displaced by the suspended particles because there is always some dark liquid left on the screen or around the particle surface. The resulting images therefore suffer some loss of contrast.

An alternative way of creating contrasting images is to have a dispersion that contains both black and white dielectric particles having opposite charges. When an electric field is applied, the black and white particles are caused to migrate in opposite directions due to their opposite polarity. This creates the desired image with black and white contrast. Since the black and white dielectric particles have opposite charges, they will completely separate and migrate in opposite directions under the applied electric field, without leaving any black particles on the white image or any white particles on the black image. This produces highly contrasted black and white images. Ideally, the black and white dielectric particles must have optimum electrophoretic mobilities and be thermodynamically stable in the same medium in order to have reasonable imaging speed and to prevent flocculation due to the electrostatic attraction between the oppositely-charged particles.

In nature, as well as in industry, aggregation of oppositely-charged particles in dispersion has been shown in a large variety of fields such as soil conditioning, water purification, filtration and adhesion or aggregation of biological cells. Good examples are given in Colloids and Surface, 6, 83(1983); 6, 101(1983) and in Journal of Chemical Society Faraday, 76, 665(1980), in which the particles adsorption isotherms of small positively-charged polystyrene particles onto large negatively-charged polystyrene particles have been reported. In the prior art, it has proven difficult to produce an electrophoretic dispersion containing oppositely-charged particles without flocculation, particularly in non-aqueous systems. Theoretically, with the addition of a proper polymeric stabilizer, it is possible to stabilize two oppositely-charged particles in the same medium if the steric repulsion provided from the absorbed polymer layer can overcome the electrostatic attraction between the two oppositely-charged particles. However, very few surfactants have been found to be able to produce enough steric repulsion to stabilize oppositely-charged particles without trading off their electrophoretic mobility. Accordingly, there is no known electrophoretic image display, which gives a highly contrasted black and white image.

SUMMARY OF THE INVENTION

The problems and disadvantages associated with conventional dielectric dispersions are overcome by the present invention which includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second pluralities. A method in accordance with the present invention for making a dielectric dispersion includes providing a dielectric fluid; preparing a first plurality of particles of a first color and having a surface charge of a selected polarity; preparing a second plurality of particles of a second color having a surface charge of opposite polarity to that of the first plurality and a steric repulsion thereto preventing coagulation of said first and second pluralities; and dispersing the first plurality of particles and second plurality of particles in the dielectric fluid. A charge control agent is added to the dielectric fluid.

DETAILED DESCRIPTION OF THE INVENTION

Figure 1:
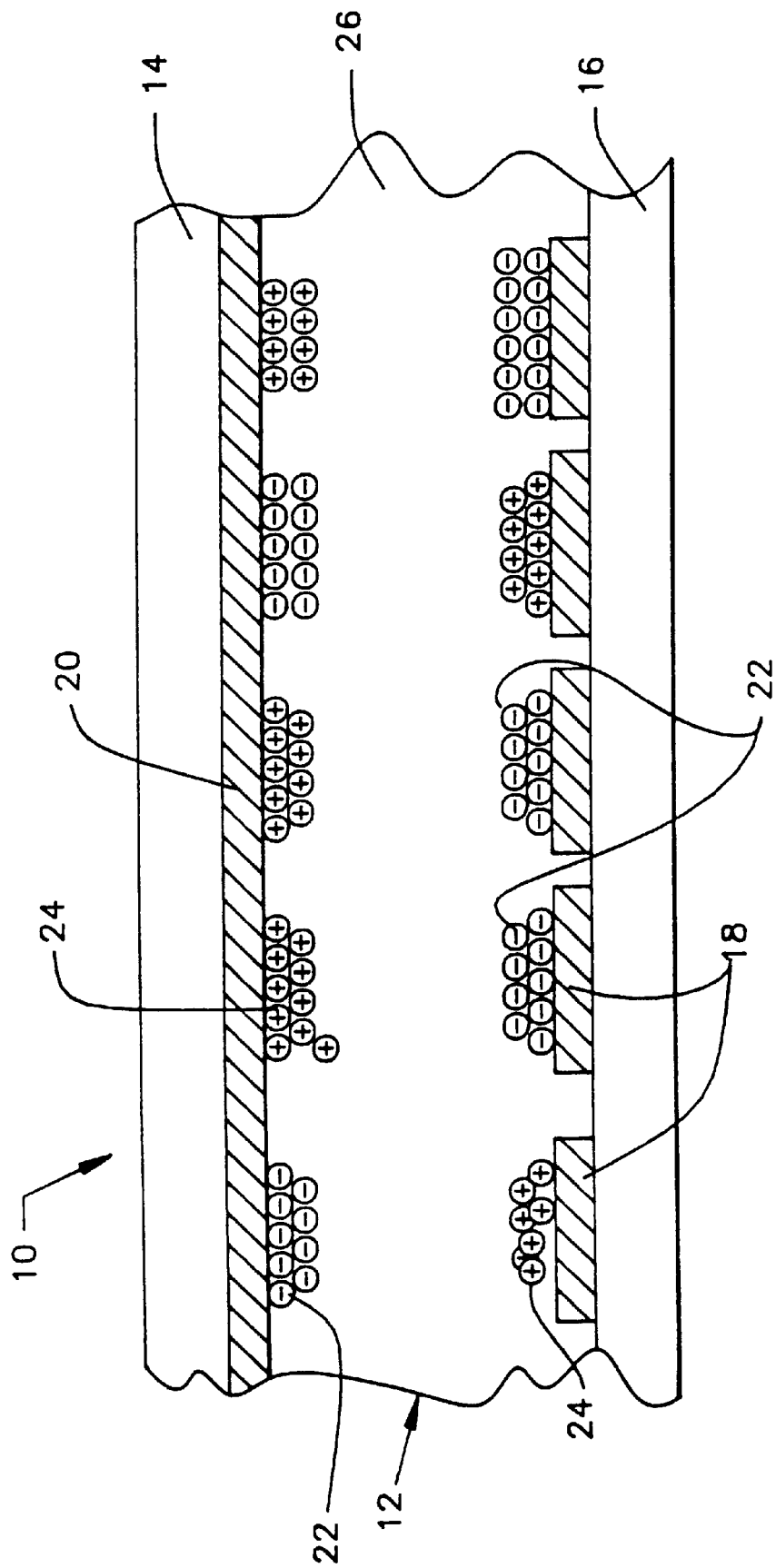
FIG. 1, the sole figure, is a diagrammatic, cross-sectional view of an EPID having particles in accordance with a first embodiment of the present invention.

In the present invention, electrophoretic dispersions containing two types of particles having different colors e.g., black and white, and opposite charges, which are thermodynamically stable, are produced by properly selecting certain surfactants which selectively charge the different types of particles positively and negatively, and also provide enough steric repulsion to prevent the flocculation of the oppositely-charged particles without trading off their electrophoretic mobilities.

Products in accordance with this invention can also be used in electrostatic printing for color images. In the prior art, conventional electrostatic printing produces color images by a multi-step printing process in which each step of printing only forms one color. Combinations of different color images from each single printing process, thereby, produce a desired color image. Since the formation of each color image needs to go through every single printing cycle, it usually takes a long time to produce a multi-colored image. In this invention, electrophoretic dispersions containing two different color particles with opposite charges are capable of producing two color images in one printing cycle resulting in energy and time saved.

Although the present invention's electrophoretic dispersions can be used in many different applications where dispersions containing different color particles with opposite charges are desired, such as paint, ink and electrostatic toner, it is especially suitable for use in connection with electrophoretic image displays (EPIDs). Accordingly, the present invention will be described in connection with a typical EPID.

Referring to FIG. 1, there is shown a cross sectional view of a segment of a simple electrophoretic image display 10 magnified to show a single pixel. As will be recognized by a person skilled in the art, an EPID may contain a volume of an electrophoretic dispersion 12 disposed between an anode 14 and a cathode 16. The anode 14 and cathode 16 are deposited upon glass plates 18, 20 in the form of a thin layer of indium-tin-oxide (ITO) or a like compound. The ITO layer is deposited in such a manner as to be substantially transparent when viewed through the glass plates 20, 18.

In accordance with an embodiment of the present invention, the electrophoretic dispersion 12 is comprised of white dielectric electrophoretic particles 22 suspended in a dark color medium 24. The electrophoretic particles 22 have a density substantially equivalent to that of the fluid medium 24 so as to remain randomly disperse.

Referring again to FIG. 1, in the embodiment shown, the electrophoretic dispersion 12 is comprised of black dielectric particles 22 and white dielectric particles 24 suspended in a clear medium 26. When a selected electrical bias is applied between a cathode line 14 and an anode line 16, the black dielectric particles 22 and white dielectric particles 24 separate and migrate in opposite directions to the cathode line 14 and anode line 16 due to the opposite polarity of the black and white particles, thereby creating an image with optical contrast between the black electrophoretic particles 22 and the white electrophoretic particles 24. The vertical dashed arrows 28 show the direction of motion.

As indicated above, the production of an electrophoretic dispersion containing two types of particles with different colors and opposite charges is highly desirable to produce black and white contrasting images. However, a major problem associated therewith is creating a thermodynamically stable electrophoretic dispersion with oppositely-charged particles. The present invention white electrophoretic particles 22 and black electrophoretic particles 24 may be formed from crosslinked polymer particles using a two stage dispersion polymerization technique with and without staining with a metal oxide, respectively. Since the surface functionalities of the electrophoretic particles can be well controlled during the polymerization, the black and white particles can be made with acidic and basic (or basic and acidic) surface characteristics, respectively and can be charged negatively and positively (or positively and negatively). In general, the polymeric materials are dielectric and have densities close to 1 g/cm$^3$, therefore the final electrophoretic particles are non-conductive and can easily match the specific gravity of many suspension fluids. In addition, the electrophoretic particles are highly crosslinked polymer particles, which have excellent heat and solvent resistance. As a result, they can be used in a wide range of organic solvents and at high temperatures during cell sampling. In addition to the synthetic black and white polymeric particles, other light color inorganic or organic pigments such as titanium dioxide, zinc oxide, silica, Dairylide Yellow, perinone orange, Ultramarine Blue and the like, can also be used to form contrast images with the black synthetic polymer particles.

To form electrophoretic dispersions containing two types of particles with different colors and opposite charges, surfactants are selected to charge the two different types of particles positively and negatively and to provide a strong steric repulsion between the two oppositely-charged particles to form a thermodynamically stable dispersion. As will be recognized by a person skilled in the art, surface charging for a non-aqueous dispersion is dependent upon the surface functionality of the particles and the charge control agent selected. The surface functionality of particles can be controlled during the formation of particles or be modified after the formation of particles by chemical or physical means.

PROCESS ONE

In an exemplary embodiment of the present invention, the electrophoretic dispersion is made to contain both positively-charged black particles and negatively-charged white particles (or negatively-charged black particles and positively-charged white particles) in a dielectric medium. The black and white dielectric particles are each separately prepared by a two-stage dispersion polymerization technique. The polymerization recipes for producing the positively-charged and negatively-charged polymer particles are listed in Table I and Table II, respectively.

TABLE I

| Materials | Weight (g) |
|---|---|
| Methanol | 100 |
| divinylbenzene | 5 |
| styrene | 5 |
| 2,2'-azobisisobutyronitrile | 0.5 |
| poly(vinyl pyrrolidone) | 2 |
| Acrylamide | 0.5 |

TABLE II

| Materials | Weight (g) |
|---|---|
| Methanol | 100 |
| divinylbenzene | 5 |
| styrene | 5 |
| 2,2'-azobisisobutyronitrile | 0.5 |
| poly(acrylic acid) | 2 |
| methacrylic acid | 0.5 |

Although prepared separately, the oppositely charged dielectric particles are formed by essentially the same overall process. Namely, prior to use, the inhibitors of the monomer styrene and the crosslinker divinylbenzene are removed by washing with 10% NaOH aqueous solution several times, drying with calcium carbonate overnight at 0° C. and then passing through a column containing an appropriate inhibitor remover. The inhibitor-free monomers and crosslinker are stored in a freezer for later use. In this, and subsequent processes, the styrene is of the type commercially available from Fisher Scientific, Inc. and the divinylbenzene is of the type commercially produced by Aldrich Chemical Co.

The initiator, 2,2-azobisisobutyronitrile (AIBN), is made by Kodak Co. and the stabilizers, poly(vinyl pyrrolidone) (PVP) and poly(acrylic acid), are made by GAF Co. and Aldrich Co. respectively. The second stage monomers, acrylamide and methacrylic acid, and the dispersion medium, methanol, are of the types commercially available from Fisher Scientific, Inc.

The styrene and divinylbenzene are mixed with methanol and charged to a closed container containing the initiator and stabilizer which are carefully weighed. The closed container is purged with nitrogen by bubbling through the solution for a certain time. The container is then warmed and agitated for a desired reaction time. In one preferred embodiment, the mixture is tumbled at thirty revolutions per minute for eight hours at sixty degrees celsius. After eight hours of tumbling, the second stage monomer, either methacrylic acid or acrylamide, is injected into the container which continues to tumble at the same reaction condition for another desired reaction time. The final product made by the two stage dispersion polymerization process is highly crosslinked poly (styrene-co-divinylbenzene) particles with polyacrylamide grafted on the surface in the case of acrylamide as the second stage monomer or, in this case of methacrylic acid, poly (methacrylic acid) is grafted on the surface. The final particles are uniform in size and vary from 0.2 to 2 $\mu$m depending upon the reaction media used, i.e. mixtures of methanol and xylene produce larger particles. The particle size being dependent upon the ratio of the mixed solvents. The final particles are dielectric with good whiteness and have densities close to 1 g/cm$^3$.

To form dark particles, one or the other of the polymer particles produced from the preceding process are separated from the dispersion medium by centrifuging and decanting the dispersion medium. They are then mixed and tumbled with a two weight percent osmium tetroxide aqueous solution at room temperature for a desired reaction time. The osmium tetroxide reacts with, and stains, the residual double bonds of the poly(styrene-co-divinylbenzene) particles, thereby resulting in highly crosslinked polymer particles having a desired degree of blackness, that can be used as the present invention black dielectric particles 22. It should be understood that in place and stead of the osmium tetroxide, ruthenium tetroxide or other metal oxides may also be used.

By varying the polymerization recipe of Table I and Table II and by varying other reaction parameters of the method of manufacture, the surface characteristics of the white and black particles produced can be selectively altered for particle charging. The surface functionality of the final particles can be varied by introducing different basic functional monomers, such as vinyl acetate, methyl methacrylate, acrylonitrile, N-(isobutoxymethyl) acrylamide, dimethylaminopropylmethacrylamide, and the like, at the second stage polymerization to produce poly(styrene-co-divinylbenzene) particles with basic surface characteristics which are suitable for positive charging in dielectric media Alternatively, by introducing different acidic functional monomers, such as acrylic acid, sodium styrene sulfonate, maleic acid, chlorostyrene, vinyl alcohol, and the like, at the second stage polymerization, poly(styrene-co-divinylbenzene) particles with acidic surface characteristics which are suitable for developing negatively-charged particles in dielectric media may be produced.

As will be recognized by a person skilled in the art, the other ingredients, such as the stabilizer, initiator, monomer, crosslinker, and the ratio of the monomer and the crosslinker in Table I and Table II can also be varied to effect other properties of the final particles, such as molecular weight and glass transition temperature for different applications.

As will be recognized by a person skilled in the art, highly crosslinked polymer particles having surfaces with controlled acidic moieties or basic moieties, made by emulsion polymerization, miniemulsion polymerization, microemulsion polymerization, suspension polymerization, precipitation, seeded emulsion polymerization or seeded dispersion polymerization, could be used as the white or as the black (after being stained with the metal oxide) electrophoretic particles.

After the polymerization process, each of the final polymer particle products are transferred from their respective dispersion mediums to a desired dielectric medium by a washing process. This involves mixing the final product with a solvent which is mutually soluble in both the dispersion medium and the desired dielectric medium, centrifuging the mixture to separate the particles and the liquids and decanting the supernatant to receive the concentrated particles. The washing process is repeated several times until the dispersion medium (methanol) is completely removed. The solvent washed particles are then redispersed in a dielectric medium with the addition of a desired charge control agent. The particles made from the Recipe I (Table I) exhibiting basic surface functionality, which can be charged positively by a positive charge control agent, can be used either as white positively-charged particles if not stained with a metal oxide, or as black positively-charged particles after being stained with a metal oxide. Similarly, the particles made from Recipe II (Table II) exhibiting acidic surface functionality, which can be charged negatively by a negative charge control agent, can be used as white negatively-charged particles if not stained with a metal oxide or as black negatively-charged particles after being stained with a metal oxide.

The preferred dielectric media for the final dispersion are non-polar solvents such as tetrachloroethylene, carbon tetrachloride, pentane, octane, decane, cyclohexane, benzene, xylene, sec-butylbenzene, Isopars, and the like, or a mixture of these liquids. The solvents used for washing the particles should be mutually soluble in both the dispersion medium and the dielectric medium. Examples are ethanol, propanol, butanol, acetone, tetrahydrofuran, ketones, ethers, esters, and the like.

The preferred surfactants in the present invention are functionalized polymeric (or oligomeric) compounds which not only function as charge control agents for particle charging but also function as steric stabilizers to prevent coagulation. In accordance with the present invention, the molecular weight of the surfactants ranges from a few thousand to hundreds of thousands. Simultaneously using two different surfactants having similar molecular weight and chemical structure but different end groups, is preferred. The surfactants used for negative charging preferably have basic end groups; with the surfactants used for positive charging preferably having acidic end groups. Examples for negative and positive charging are polyisobutylene succinimide and polyisobutylene succinic anhydride, respectively. The chemical structure of these two surfactants are given below:

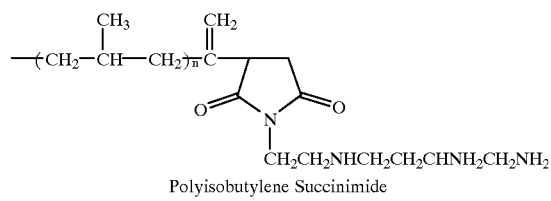

Polyisobutylene Succinimide

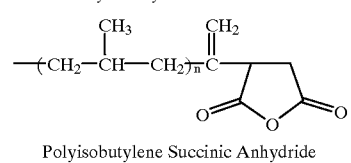

Polyisobutylene Succinic Anhydride

Alternatively, mixtures of charge control agents and steric stabilizers are also useful in producing a thermodynamically stable dispersion containing positively-charged and negatively-charged particles. The desirable charge control agents for positive charging are surfactants with acidic character such as cupric naphthenate, zirconium octoate, zinc octoate, calcium octoate, polyvinyl alcohol, polyacrylic acid, polymethacrylic acid, polyvinyl chloride, and the like. The desirable negative charge control agents, however, are surfactants with a basic character such as barium petronate, barium sulfonate, barium dinolynphthalenesulfonate, metal oxides, polyvinyl pyridine, pyridine, lecithin, polyvinyl acetate, polyethylene oxide, polymethyl methacrylate, polyacrylamide, polyesters, polyethers, and the like. The preferred stabilizers or co-stabilizers used with the charge control agents are typically high molecular weight compounds including homopolymers, copolymers, graft polymers, block copolymer, natural high molecular weight compounds, and the like. Specific examples of suitable stabilizers are poly(12-hydroxystearic acid)-graft-poly (methyl methacrylate-methacrylic acid), polystyrene-co-poly(vinyl pyridine), poly(vinyl alcohol)-co-polyethylene, polyisobutylene-co-polyacrylic acid, polyisobutylene-co-polyamide, and the like.

After preparing the black and white electrophoretic dispersions individually, the positively-charged white dispersion is then mixed with the negatively-charged black dispersion or the positively-charged black dispersion is mixed with the negatively-charged white dispersion to form a thermodynamically stable electrophoretic dispersion containing both black and white dielectric particles with opposite charges. The mixed dispersion is gray in color, however, it forms a black and white contrasting image after applying an electric field in an electrophoretic image display.

As will be recognized by a person skilled in the art, the ratio of the black and white electrophoretic dispersions can be varied to produce a desired degree of black and white contrast in EPIDs.

PROCESS TWO

In the following description of alternative embodiments in Processes Two through Seven, the preferred dielectric media, solvents for washing the particles, surfactants, stabilizers, charge control agents, and co-stabilizers are the same as those described in Process One above unless otherwise noted. In a second, alternative embodiment of the present invention, the black electrophoretic dispersions with positively-charged or negatively-charged particles made by Process One are mixed with a negatively-charged or positively-charged titanium dioxide dispersion to form an electrophoretic dispersion which is able to produce black and white contrasting images.

The titanium dioxide particles are either pre-treated with alumina to form a basic surface or pre-treated with silica to form an acidic surface, which can be positively charged with a positive charge control agent or be negatively charged with a negative charge control agent respectively, and mixed with the negatively-charged or positively-charged black dispersion to produce black and white contrasting images in EPIDs.

PROCESS THREE

In a third alternative embodiment of the present invention, electrophoretic dispersions containing positively-charged black particles and negatively-charged white particles or negatively-charged black particles and positively-charged white particles are made to produce black and white contrasting images in EPIDs.

The black electrophoretic dispersions with positively-charged or negatively-charged particles are made by Process One and the white electrophoretic dispersions are mixtures of the white electrophoretic dispersions made by Process One and titanium dioxide dispersions.

As in Process Two, the titanium dioxide particles are either pre-treated with alumina to form a basic surface or pre-treated with silica to form an acidic surface, which can be positively charged with a positive charge control agent or be negatively charged with a negative charge control agent respectively. The particles are then mixed with the positively or negatively-charged white dispersion made by the Process One yielding a fluid which produces black and white contrasting images in EPIDs.

PROCESS FOUR

In a fourth alternative embodiment of the present invention, the black electrophoretic dispersions with positively-charged or negatively-charged particles made by Process One are mixed with a yellow electrophoretic dispersion to form an electrophoretic dispersion which is able to produce black and yellow contrasting images.

The yellow particles are either organic or inorganic pigments such as Dairylide Yellow, Hansa Yellow, Benzidine Yellow and the like. The yellow pigments can be modified to produce a basic or acidic surface, which can be positively charged with a positive charge control agent or be negatively charged with a negative charge control agent respectively, and mixed with the negatively-charged or positively charged black dispersion to produce black and yellow contrasting images in EPIDs.

PROCESS FIVE

In a fifth alternative embodiment of the present invention, the black electrophoretic dispersions with positively-charged or negatively-charged particles made by Process One are mixed with a light-color electrophoretic dispersion to form an electrophoretic dispersion which is able to produce black and light color contrasting images.

The light-color particles are either organic or inorganic pigments such as titanium dioxide, zinc oxide, silica, zinc sulfide, calcium silicate, alumina hydrate, Dairylide Yellow, Arylide Yellow, Diarylide Orange, Perinone Orange, Ultramarine Blue and the like. The light color pigments are further modified to produce a basic surface or acidic surface, which can be positively charged with a positive charge control agent or be negatively charged with a negative charge control agent respectively, and mixed with the negatively-charged or positively charged black dispersion to produce black and yellow contrasting images in EPIDs.

As will be recognized by a person skilled in the art, the ratio of the black and light-colored electrophoretic dispersions can be varied to produce a desired degree of black and light-color contrast in EPIDs.

PROCESS SIX

In a sixth alternative embodiment of the present invention, the black electrophoretic dispersions with positively-charged or negatively-charged particles made by Process One are mixed with a mixture of light-color electrophoretic dispersions to form an electrophoretic dispersion which is able to produce black and a desired color contrasting images.

The light-color particles are either organic or inorganic pigments such as the white polymeric particles made the Process One, Titanium dioxide, zinc oxide, silica, zinc sulfide, calcium silicate, alumina hydrate, Dairylide Yellow, Arylide Yellow, Diarylide Orange, Perinone Orange, Ultramarine Blue and the like. The light color pigments are be further modified to same surface characters and mixed together, which can be positively charged with a positive charge control agent or be negatively charged with a negative charge control agent respectively, and mixed with the negatively-charged or positively-charged black dispersion to produce black and a desired color contrasting images in EPIDs.

PROCESS SEVEN

In a seventh alternative embodiment of the present invention, a dark color electrophoretic dispersion with positively-charged or negatively-charged particles is mixed with a mixture of light-color electrophoretic dispersion to form an electrophoretic dispersion which is able to produce dark and desired color contrasting images.

The dark-color particles are either organic or inorganic pigments such as carbon black, iron oxide black, lamp black, Zn Fe Cr brown Spinel, Magnesium Ferrite, Chreen Spinel, Cr oxide Green, Indanthrone Blue, Ultramarine Blue Dioxazine Violet, Quinacridone Violet, Anthraquinoid Red, Perylene Red and the like. The light-colored particles are either organic or inorganic pigments such as the white polymeric particles made by Process One, titanium dioxide, zinc oxide, silica, zinc sulfide, calcium silicate, alumina hydrate, Dairylide Yellow, Arylide Yellow, Diarylide Orange, Perinone Orange and the like. The light-color pigments are further modified to same surface characters and mixed together, which can be positively charged with a positive charge control agent or be negatively charged with a negative charge control agent respectively, and mixed with the negatively-charged or positively charged dark-color dispersion to produce a desired color contrasting images in EPIDs.

As will be recognized by a person skilled in the art, the ratio of the dark-color and light-color electrophoretic dispersions can be varied to produce a desired degree of dark-color and light-color contrast in EPIDs.

All equivalents, variations and modifications that can be applied to the described present invention by a person skilled in the art, are intended to be included within the scope of this invention as defined by the appended claims.

What is claimed is:

1. A dielectric dispersion, comprising:
   (a) a dielectric fluid;
   (b) a first plurality of particles of a first color having a surface charge of a selected polarity dispersed within said dielectric fluid; and
   (c) a second plurality of particles of a second color which contrasts substantially with said first color, having a surface charge of opposite polarity to that of said first plurality of particles; and
   (d) means for preventing coagulation of said first and second plurality of particles, wherein said means includes a charge control agent for positively charging said first plurality of particles., a second charge control agent for negatively charging said second plurality of particles, and a stabilizer for thermodynamically stabilizing said first plurality of particles and said second plurality of particles, wherein said stabilizer is selected from the group consisting of homopolymers, copolymers, graft polymers, block polymers, and natural high molecular weight compounds.

2. The dispersion of claim 1, wherein said first and second plurality of particles have basic and acidic surface functionalities, respectively.

3. The dispersion of claim 2, wherein said charge control agents are each of comparable molecular weight and structure but have differing end groups.

4. The dispersion of claim 3, wherein said first charge control agent is selected from the group consisting of cupric napthenate, zirconium octoate, zinc octoate, calcium octoate, polyvinyl alcohol, polyacrylic acid, polymethacrylic acid, and polyvinyl chloride.

5. The dispersion of claim 4, wherein said second charge control agent is selected from the group consisting of polyisobutylene succinimide, barium petronate, barium sulfonate, barium dinonylnaphthalensulfonate, metal oxides, polyvinyl pyridine, pyridine, lecithin, polyvinyl acetate, polyethenlene oxide, polymethyl methacrylate, polyacrylamide, polyesters and polyethers.

6. The dispersion of claim 5, wherein one of said two pluralities of particles is dark colored, the other said plurality of particles is light colored and said dielectric fluid is clear.

7. The dispersion of claim 6, wherein at least one of said two pluralities of particles are polymer particles with an outer layer of a different polymer grafted onto the surface thereof.

8. The dispersion of claim 7, wherein both said first and second pluralities of particles are polymer particles with an outer layer of a different polymer grafted onto the surface thereof.

9. The dispersion of claim 8, wherein one of said two pluralities of particles is dyed black by exposure to a metal oxide.

10. The dispersion of claim 9, further including a third plurality of titanium dioxide particles.

11. The dispersion of claim 10, wherein said titanium dioxide particles are pretreated with alumina to form a basic surface thereon for positive surface charging.

12. The dispersion of claim 10, wherein said titanium dioxide particles are pretreated with silica to form an acidic surface thereon for negative surface charging.

13. The dispersion of claim 7, wherein said first plurality of particles are polymer particles with an outer layer of a different polymer grafted onto the surface thereof and dyed by exposure to a metal oxide and said second plurality of particles are yellow pigments selected from the group consisting of dairylide yellow, hansa yellow and benzidine yellow.

14. The dispersion of claim 7, wherein said first plurality of particles are polymer particles with an outer layer of a different polymer grafted onto the surface thereof and dyed by exposure to a metal oxide and said second plurality of particles are light colored pigments selected from the group consisting of titanium dioxide, zinc oxide, silica, zinc sulfide, calcium silicate, alumina hydrate, dairylide yellow, arylide yellow, diarylide orange, perinone orange and ultramarine blue.

15. The dispersion of claim 6, wherein said dark colored particles are selected from the group consisting of carbon black, iron oxide black, lamp black, ZnFeCr brown spinel, magnesium ferrite, chreen spinel, Cr oxide green, indanthrone blue, ultramarine blue, dioxazine violet, quinacridone violet, anthraquinoid red and perylene red and said light colored particles are selected from the group consisting of poly(styrene-co-divinylbenzene)/polyacrylamide, poly(styrene-co-divinylbenzene)/poly(methacrylic acid), titanium dioxide, zinc oxide, silica, zinc sulfide, calcium silicate, alumina hydrate, dairylide yellow, arylide yellow, diarylide orange and perinone orange.

16. The dispersion of claim 1, wherein said first charge control agent is a surfactant comprising polyisobutylene succinic anhydride and said second charge control agent is a surfactant comprising polyisobutylene succinimide.

17. The dispersion of claim 16, wherein said first charge control agent charges said first plurality of particles positive and said second charge control agent charges said second plurality of particles negative.

18. The dispersion of claim 1, wherein said dielectric fluid is selected from the group consisting of tetrachloroethylene, carbon tetrachloride, pentane, octane, decane, cyclohexane, benzene, xylene, sec-butylbenzene and Isopars.

* * * * *